United States Patent [19]

Rom et al.

[11] 4,132,217

[45] Jan. 2, 1979

[54] SOLAR AIR HEAT COLLECTOR

[75] Inventors: Frank E. Rom, Avon Lake; Carl J. Wenzler, North Ridgeville, both of Ohio

[73] Assignee: Solar Energy Products Company, Avon Lake, Ohio

[21] Appl. No.: 801,100

[22] Filed: May 27, 1977

[51] Int. Cl.$^2$ ............................................. F24J 3/02
[52] U.S. Cl. ................................. 126/270; 126/271
[58] Field of Search ............... 126/270, 271; 237/1 A

[56] References Cited

U.S. PATENT DOCUMENTS

| 3,089,480 | 5/1963 | Duncan | 126/270 |
| 3,894,685 | 7/1975 | Keyes et al. | 126/270 |
| 3,985,116 | 10/1976 | Kapany | 126/270 |
| 3,996,918 | 12/1976 | Quick | 126/270 |
| 4,011,856 | 3/1977 | Gallagher | 126/271 |
| 4,019,494 | 4/1977 | Safdari | 126/270 |
| 4,033,324 | 7/1977 | Eckels | 126/270 |
| 4,046,133 | 9/1977 | Cook | 126/270 |
| 4,054,124 | 10/1977 | Knoos | 126/270 |

Primary Examiner—Kenneth W. Sprague
Attorney, Agent, or Firm—Fay & Sharpe

[57] ABSTRACT

A solar air heat collector includes a generally rectangular box-like housing of thermal insulating material and having an open front closed by a transparent plate. A corrugated solar heat absorber panel is supported in predetermined spaced relationship to the housing back wall in a location intermediate the transparent plate and the housing back wall by support rails extending along the housing side walls. A substantially sealed air space is defined between the transparent plate and absorber panel, and an air flow passage is defined between the absorber panel and the housing back wall.

21 Claims, 7 Drawing Figures

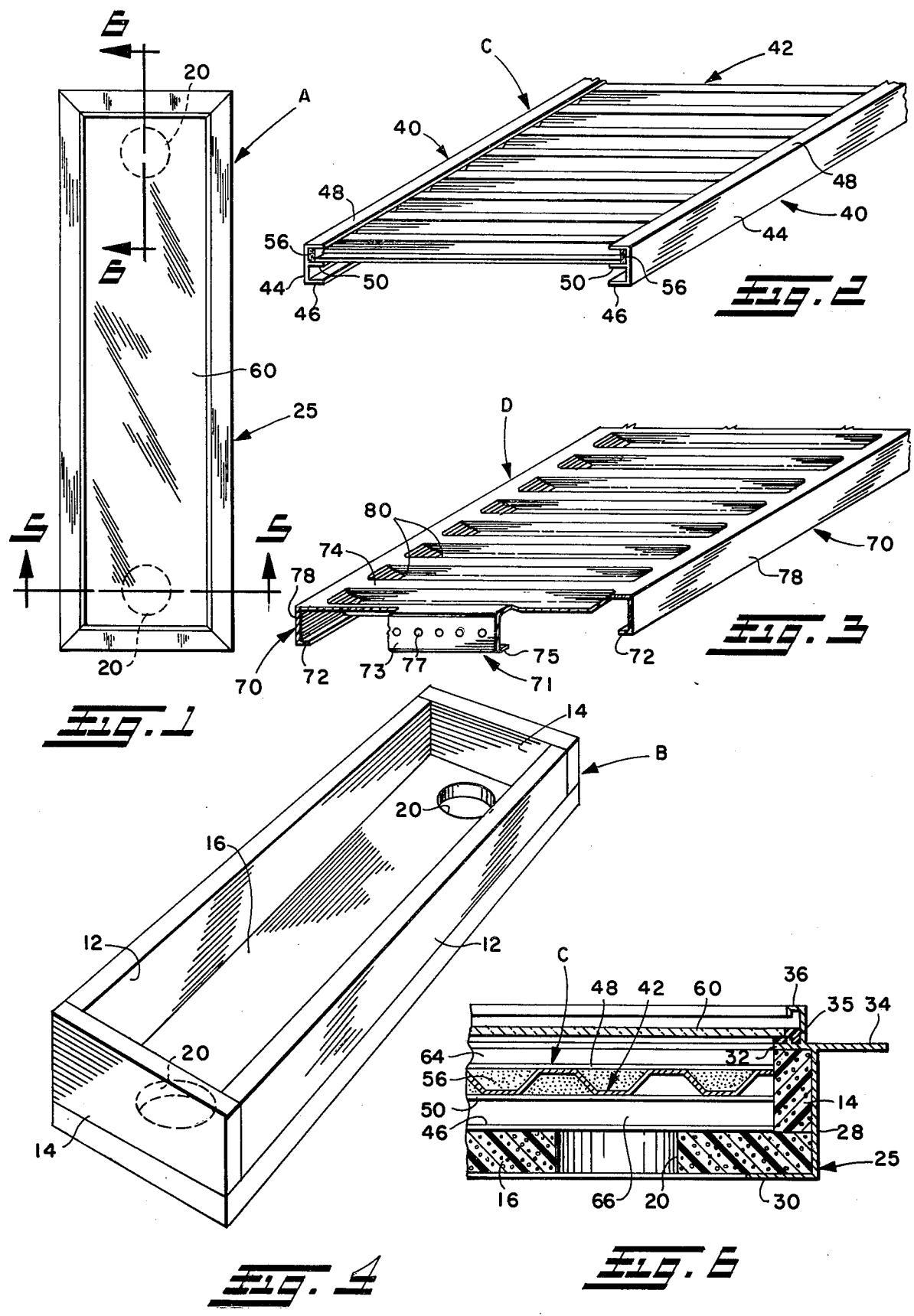

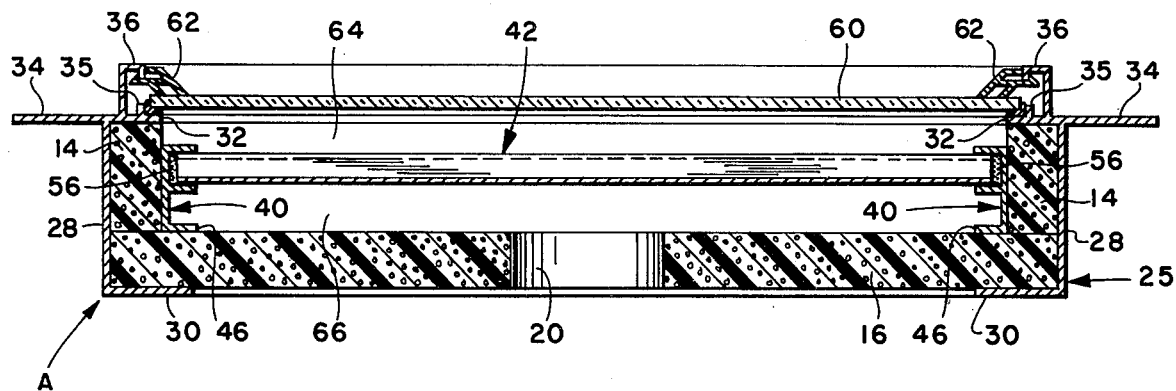

SOLAR AIR HEAT COLLECTOR

BACKGROUND OF THE INVENTION

This application relates to the art of heat exchangers and, more particularly, to heat exchangers for absorbing solar radiation to trap heat and then transfer the heat to a moving air stream.

The invention is particularly applicable to prefabricated solar air heat collectors which can be positioned between roof rafters of a building or between building wall studs to perform the dual function of enclosing the building and serving as solar heat absorbers. However, it will be appreciated that certain aspects of the invention can be used in environments other than prefabricated solar air heat collectors.

The increasing cost and scarcity of conventional fossil fuels has created renewed interest in solar energy. Solar heat collectors using liquids must be sealed extremely well to prevent leaks and anti-freeze is necessary to avoid problems with freezing. In addition, corrosion is a problem requiring the use of expensive materials for assembling the collectors. Therefore, solar air heat exchangers are gaining acceptance as a relatively low cost arrangement for using solar energy to heat buildings.

One solar air heat collector of a known type is a prefabricated unit for positioning between roof rafters or wall studs and replaces the conventional exterior roofing or wall covering materials. Collectors of this type include a generally rectangular box-like housing of thermal insulating material having an open front closed by a transparent plate. A corrugated metal panel is supported in the housing intermediate its back wall and the transparent plate for absorbing solar radiation. Openings in the housing back wall adjacent its ends provide air flow through the housing between its back wall and the corrugated panel for removing heat from the corrugated panel and transferring it to a storage structure or to the building. In previous arrangements of this type, the corrugated panel has been supported in grooves formed in the thermal insulating material forming the side walls of the housing. Manufacture of the housing side walls with such grooves is relatively expensive, and assembly of the collector is quite difficult because the corrugated absorber panel must be assembled at the same time the housing is assembled.

It would be desirable to have a simplified arrangement for mounting a corrugated heat absorber panel within a box-like housing in predetermined spaced relationship to the housing back wall for simplifying assembly of the collector.

SUMMARY OF THE INVENTION

A solar air heat collector of the type described includes a solar heat absorber assembly in the form of a pair of elongated spaced-apart parallel side rails having main web portions. Mounting flanges extend inwardly toward one another from one longitudinal edge of the web portions for supporting the rails on the back wall of the collector housing. An absorber panel spans the web portions of the rails adjacent the other longitudinal edges thereof, and the absorber panel is corrugated along substantially its full length with corrugations extending in a direction across the rails. The heat absorber assembly can simply be placed into the box-like collector housing after the housing has been assembled. This greatly simplifies assembly of the entire collector, and the mounting flanges on the rails engage the housing back wall to space the corrugated absorber panel in a predetermined distance from the housing back wall. This arrangement provides a substantially sealed air insulation chamber between the absorber panel and the transparent plate, and provides an air flow passage between the absorber panel and the housing back wall.

In accordance with an important aspect of the application, limited communication between the insulation chamber and the air flow passage takes place through air flow inhibiting and filtering material. This substantially seals the insulation chamber while allowing some breathing thereof in order to prevent or remove condensation in the insulation chamber, and particularly on the inside surface of the transparent plate. The air flow inhibiting and filtering material also minimizes entry of the dust or other foreign matter into the insulation chamber, thus preventing deposits on the transparent plate which could, in time, reduce collector performance.

In one arrangement, the corrugated panel used in the heat absorber assembly is integral with the rails so that the entire absorber assembly is formed from a single sheet of aluminum or the like. The air flow inhibiting and filtering material is positioned between the longitudinal ends of the panel and the ends of the housing.

In another arrangement, the rails have inwardly facing longitudinal grooves receiving the opposite side edges of the corrugated absorber panel. The air flow inhibiting and filtering material is interposed between the grooves and the side edges of the absorber panel.

The corrugated absorber plate is preferably formed of thin metal such as aluminum and is black at least on its surface facing the transparent plate. It will be recognized that other materials and metals including plastics and steel can be used for certain purposes. However, aluminum is a relatively low cost metal having high heat transfer characteristics and is highly advantageous in a preferred form of the invention.

In a preferred arrangement, the rails are substantially E-shaped in cross-section and are positioned with the legs of the E's extending toward one another. One outer leg of the E's defines the mounting flanges for the rails, and the other outer legs of the E's cooperate with the intermediate legs thereof to define the inwardly facing longitudinal grooves which receive the opposite side edges of the absorber panel.

It is a principal object of the present invention to provide an improved solar heat absorber assembly for use in a solar air heat collector.

It is another object of the invention to provide some breathing between an insulation chamber and an air flow passage through an air flow inhibiting and filtering material.

It is a further object of the invention to provide an improved solar air heat collector.

It is an additional object of the invention to provide a solar air heat collector which is very simple to manufacture and assemble.

It is also an object of the invention to provide an improved solar air heat collector having a heat absorber assembly which can be dropped into the collector housing and is automatically placed in a desired intermediate position between the collector housing back wall and a front transparent plate.

BRIEF DESCRIPTION OF THE DRAWINGS

The invention may take physical form in certain parts and arrangements of parts, a preferred and alternative embodiments of which will be described in detail in this specification and illustrated in the accompanying drawings which form a part hereof and wherein:

FIG. 1 is a plan view of a prefabricated solar air heat collector having the improved features of the present invention incorporated therein:

FIG. 2 is a partial perspective illustration of a solar heat absorber assembly;

FIG. 3 is a partial perspective illustration of another form of a solar heat absorber assembly;

FIG. 4 is a perspective illustration of a box-like housing used in the collector of FIG. 1;

FIG. 5 is a cross-sectional elevational view taken generally on lines 5—5 of FIG. 1;

FIG. 6 is a partial cross-sectional elevational view taken generally on lines 6—6 of FIG. 1; and, FIG. 7 is a view similar to FIG. 6 and showing the absorber panel of FIG. 3 positioned in the collector housing.

DESCRIPTION OF PREFERRED EMBODIMENTS

Referring now to the drawings wherein the showings are for purposes of illustrating certain preferred embodiments of the invention and not for purposes of limiting same, FIG. 1 shows a solar air heat collector A having the improved features of the present application incorporated therein. Collector A includes a generally rectangular box-like housing B shown in FIG. 4 as including spaced-apart parallel side walls 12, spaced-apart parallel end walls 14 and a back wall 16, all suitably secured together and formed of thermal insulating material. Housing B may be formed of any suitable thermal insulating material including, but not necessarily limited to, rigid urethane or isocyanurate, or polystyrene structural foam. Openings 20 are formed through back wall 16 adjacent the opposite ends of housing B. The outer edges of side walls 12 and end walls 14 lie in a common plane opposite from back wall 16 and define an outer peripheral edge of an open front of housing B opposite from back wall 16.

The individual members of housing B may be secured together by suitable adhesive or other fastening means if so desired. In addition, housing B is held in assembled relationship and protected by a rectangular metal, wooden or plastic frame generally indicated by numeral 25 in FIGS. 1, 5 and 6. Rectangular frame 25 is assembled from a plurality of individual frame members welded or suitably secured together by mechanical fasteners at the corners of collector A. The individual frame members have a cross-sectional configuration including a main web 28 having an inwardly extending longitudinal flange 30 at one longitudinal edge thereof. Inwardly and outwardly extending flanges 32 and 34 are provided on the other longitudinal edge of web 28. A relatively small outwardly extending longitudinal projection 35 is provided on inwardly extending flange 32. A longitudinal projection 36 extends outwardly from inner flange 32 and then extends inwardly in outwardly-spaced overlying relationship to inner flange 32, and then extends back toward inner flange 32 and terminates in spaced relationship thereto. Suitable adhesive or the like may be used for securing the individual members of housing B in FIG. 4 within the rectangular peripheral frame 25 if so desired.

FIG. 2 shows a solar heat absorber assembly C including a pair of spaced-apart parallel rails 40 for supporting an absorber panel 42. Each rail 40 is generally E-shaped in cross-section and includes a main web 44 having three equidistantly spaced legs extending from one side thereof. One outer leg 46 defines an inwardly extending support flange. The other outer legs 48 extending inwardly from the opposite longitudinal edges of webs 44 cooperate with intermediate legs 50 to define opposite inwardly facing longitudinal grooves receiving the opposite side edges of absorber panel 42. In the preferred arrangement, absorber panel 42 is corrugated along substantially its entire length with corrugations which extend in a direction across and perpendicular to rails 40.

Longitudinal strip 56 of air flow inhibiting and filtering material are interposed between the longitudinal grooves in rails 40 and the opposite side edges of absorber panel 42. The air flow inhibiting material may take many forms, and may be a flexible sponge-like urethane or polyester. In the preferred arrangement, however, an open pore urethane foam is preferred for reasons which will become apparent hereinafter. The air flow inhibiting material could also be a natural or synthetic sponge rubber, or a fibrous glass roving or the like. The air flow inhibiting material is preferably compressed somewhat between the bottoms of the grooves and the side edges of panel 42. Material 56 inhibits air flow through the grooves past the side edges of panel 42, while allowing some communication between the opposite sides of panel 42, and filtering the air which does flow from one side to the other.

Absorber panel 42 is preferably of relatively thin aluminum and is black at least on its outer or solar-facing surface. Obviously, other high thermal conductivity metals and materials can be used for certain purposes to obtain optimum efficiencies.

Solar heat absorber assembly 40 is simply positioned within the collector housing as shown in FIG. 5. Suitable sealant such as silicone rubber or the like is applied between flanges 46 on rails 40 and back wall 16 for securing assembly C in position. Flanges 46 spread the load of absorber assembly C over a wider area of back wall 16 and also provide a wider space for the sealant.

Suitable sealant is applied to the outer surfaces of inner flanges 32 on frame 25 up to projection 34 and a transparent plate 60 of glass or synthetic plastic is positioned on inner flanges 32 for completely closing the open top of the housing. Suitable retaining splines 62 are affixed to projections 36 and bear against the outer surface of plate 60 for retaining same in position.

Rails 40 of absorber assembly C are dimensioned for supporting absorber panel 42 intermediate back wall 16 and plate 60. In one arrangement, panel 42 may be supported approximately midway between back wall 16 and plate 60 to define a sealed air insulation chamber 64 between plate 60 and panel 42, and to define an air flow passage 66 between back wall 16 and panel 42. Air flow inhibiting and filtering material 56 is such that air flow is substantially prevented between chamber 64 and passage 66, while some breathing through material 56 can take place in order to prevent condensation within substantially sealed chamber 64. Material 56 also filters air which does pass between chamber 64 and passage 66 so that dust deposits are minimized within chamber 64.

FIG. 3 shows another absorber assembly D formed in one-piece from a single sheet of aluminum or the like. In the embodiment of FIG. 3, the opposite side rails 70 have inwardly extending support flanges 72 along one longitudinal edge thereof. Panel 74 completely spans rails 70 and its opposite side edges are integral with the other longitudinal edges of rails 70. That is, webs 78 of rails 70 have support flanges 72 extending inwardly from one longitudinal edge thereof and have panel 74 integral with the other longitudinal edges thereof. Webs 78 extend substantially perpendicular to flanges 72 and panel 74. Panel 74 also has integral end rails at the opposite longitudinal ends thereof and a cut-away portion of one such end rail is shown at 71 in FIG. 3 as including a web 73 and an inwardly extending support flange 75. Web 73 extends perpendicular to panel 74 and webs 78. A plurality of spaced-apart small holes 77 are provided through end web 73 and through the corresponding end web at the opposite end of panel 74.

Corrugations 80 are pressed into panel 74 along substantially the full length thereof and the corrugations extend in a direction across rails 70. Corrugations 80 in panel 74 are spaced-apart from one another longitudinally of panel 74 and do not extend completely across rails 70. In other words, the opposite longitudinal ends of corrugations 80 are spaced slightly inwardly from the side edges of absorber panel 74.

Absorber assembly D of FIG. 3 is positioned within the collector housing and secured therein in a similar manner as described with respect to absorber assembly C of FIG. 2. Absorber assembly D is simply positioned within housing B after suitable sealant is applied to mounting flanges 72 and 75 or back wall 16, or both. This secures and seals absorber assembly D within the housing. Rails 70 are dimensioned for locating panel 74 approximately midway between back wall 16 and front transparent plate 60. Absorber assembly D has a length somewhat less than the length of housing B between the interior surfaces of end walls 14. The opposite end rails 71 on absorber assembly D are spaced inwardly from end walls 14 to provide spaces which are filled by air flow inhibiting and filtering material 86 of the same type as described with respect to material 56. Communication can take place between chamber 64 and passage 66 through holes 77 in end webs 73 of end rails 71, and through material 86. In this arrangement, communication takes place at the opposite longitudinal ends of absorber assembly D instead of at the opposite sides as with absorber assembly C. In both arrangements, limited passages provide limited communication between the insulation chamber and the flow passage, and the limited passages are filled with air flow inhibiting and filtering material. This provides a passage means for establishing limited communication between chamber 64 and passage 66 through air flow inhibiting and filtering material 56, 86.

Solar air heat collector A of FIG. 1 is dimensioned to fit between roof rafters or walls studs and outer flanges 34 on frame 25 can be secured and sealed with appropriate sealant to the outer surfaces of such rafters or studs. Collector A takes the place of conventional roofing plus insulation or side walls plus insulation and also functions as a solar air heat collector. Solar radiation entering chamber 64 of FIG. 5 through transparent plate 60 is absorbed by black absorber panels 42 or 74 to heat such panels. Holes 20 in back wall 16 are connected by ducts with manifolds having suitable dampers and blowers for circulating air through air flow passage 66 from one opening 20 to the other. The transverse corrugations in panels 42 or 74 serve as a flow distributor to uniformly distribute the air as it flows through air flow passage 66 and provide turbulence to increase the heat transfer coefficient for optimum heat transfers from panels 42 or 74 to the flowing air.

Instead of using air, it will be recognized that it is possible to use any gaseous fluid with the solar air heat collector if so desired.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

Having thus described our invention, we claim:

1. A solar heat absorber assembly for a solar air heater or the like comprising: a pair of elongated spaced-apart parallel side rails having main web portions and being of substantially the same size and shape, each said rail having a mounting flange extending from one longitudinal edge of said web portion thereof inwardly toward the other rail, said flanges being integral with said web portions and extending along substantially the full length thereof, a continuous absorber panel spanning said web portions adjacent the other longitudinal edges thereof, said absorber panel being of a material having a high thermal conductivity and being highly absorptive of solar energy, and said panel being corrugated along substantially the full length thereof with corrugations extending in a direction across said side rails.

2. The absorber assembly as defined in claim 1 wherein said panel is integral with said side rails.

3. The absorber assembly as defined in claim 2 including integral end rails on said panel, and a plurality of air flow holes through said end rails.

4. The absorber assembly as defined in claim 1 wherein said rails have inwardly facing longitudinal grooves adjacent said other longitudinal edges, and said absorber panel has opposite panel edges received in said grooves.

5. The absorber assembly as defined in claim 4 including air flow inhibiting material interposed between the bottoms of said grooves and said opposite panel edges for inhibiting movement of air from one side to the other of said panel past said opposite panel edges.

6. The absorber assembly as defined in claim 5 wherein said air flow inhibiting material provides limited air movement therethrough to allow a substantially sealed air space on one side of said panel to breathe with an air space on the opposite side of said panel.

7. The absorber assembly as defined in claim 1 including a box-like solar air heat collector having side walls, end walls and a back wall all of thermal insulating material, said side walls and end walls having outer edges lying in a common plane opposite from said back wall to define a peripheral edge of said collector, a transparent plate sealed to said peripheral edge, said absorber assembly being positioned in said collector with said rails extending closely along said side walls and with said mounting flanges secured to said back wall, said rails supporting said absorber assembly within said collector with said panel located intermediate said transparent plate and said back wall to define an insulation chamber between said transparent plate and panel and to define a flow passage between said panel and back wall, and openings at opposite end portions of said collector for circulation of air through said flow passage.

8. The collector as defined in claim 7 wherein said absorber assembly comprises a one-piece aluminum structure and said panel has a black outer surface facing said transparent plate.

9. The collector as defined in claim 7 wherein said rails of said absorber assembly are substantially E-shaped in cross-section and are positioned with the legs of the E's extending toward one another, one outer leg of the E's defining said mounting flanges, the other outer legs of the E's cooperating with the intermediate legs thereof to define inwardly facing longitudinal grooves, and said panel having opposite side edges received in said grooves.

10. The collector as defined in claim 9 including air flow inhibiting material interposed between the bottoms of said grooves and said side edges for inhibiting flow of air between said insulation chamber and said flow passage.

11. The collector as defined in claim 10 wherein said air flow inhibiting material provides limited air movement therethrough to allow said insulation chamber to breathe and thereby minimize formation of condensation therein.

12. The collector as defined in claim 7 wherein said mounting flanges are sealed to said back wall.

13. The collector as defined in claim 7 including passage means for providing communication between said insulation chamber and said flow passage through air flow inhibiting and filtering material.

14. A solar air heat collector comprising: a box-like generally rectangular housing including side walls, end walls and a back wall all of thermal insulating material, said housing having an open front opposite from said back wall, a transparent plate closing said open front, a generally rectangular solar heat absorber panel having opposite side edges and being corrugated along substantially the full length thereof with corrugations extending in a direction across said side edges, said absorber panel being of a material having a high thermal conductivity and being highly absorptive of solar energy, support rails positioned in said housing along said side walls and supporting said panel in predetermined spaced relationship to said back wall intermediate said transparent plate and back wall to define a substantially sealed air chamber between said plate and panel and to define an air flow passage between said panel and back wall, and air flow openings in said housing adjacent the opposite ends thereof communicating with said air flow passage.

15. The collector as defined in claim 14 wherein said rails have inwardly opening longitudinal grooves receiving said side edges of said panel, and resiliently compressible air flow inhibiting material interposed between the bottoms of said grooves and side edges to inhibit passage of air between said chamber and passage.

16. The collector as defined in claim 14 wherein said rails have inwardly extending support flanges sealed to said back wall.

17. The collector as defined in claim 14 wherein said side edges of said panel are integral with said rails and said corrugations have terminal ends spaced inwardly from said side edges.

18. The collector as defined in claim 17 wherein said rails have inwardly extending support flanges sealed to said back wall.

19. The collector as defined in claim 14 wherein said rails are substantially E-shaped in cross-section, one outer leg of the E's being sealed to said back wall, the other outer legs of the E's cooperating with the intermediate legs thereof to define inwardly facing grooves receiving said side edges of said panel, and sponge-like air flow inhibiting material interposed between said grooves and side edges to inhibit flow of air between said chamber and passage.

20. The collector as defined in claim 14 including passage means for providing limited communication past said absorber panel between said air insulation chamber and air flow passage through air flow inhibiting and filtering material.

21. The collector as defined in claim 20 wherein said absorber panel includes integral end rails at the opposite ends thereof spaced inwardly from said end walls, a plurality of holes through said end rails defining said passage means, and said air flow inhibiting and filtering material being positioned between said end walls and said end rails.

* * * * *